(12) United States Patent
Chisolm

(10) Patent No.: US 7,064,947 B1
(45) Date of Patent: Jun. 20, 2006

(54) POWER SURGE PROTECTION DEVICE

(76) Inventor: Darren Chisolm, 49 Cabana La., Salters, SC (US) 29590

( * ) Notice: Subject to any disclaimer, the term of this patent is extended or adjusted under 35 U.S.C. 154(b) by 154 days.

(21) Appl. No.: 10/853,650

(22) Filed: May 26, 2004

(51) Int. Cl.
H02H 3/22 (2006.01)

(52) U.S. Cl. .................................. 361/111; 361/118
(58) Field of Classification Search ............... 361/111, 361/118
See application file for complete search history.

(56) References Cited

U.S. PATENT DOCUMENTS

| 3,890,543 | A |  | 6/1975 | Jonassen |  |
|---|---|---|---|---|---|
| 4,186,418 | A |  | 1/1980 | Seiler |  |
| 4,807,083 | A |  | 2/1989 | Austin |  |
| 5,341,265 | A |  | 8/1994 | Westrom et al. |  |
| 5,371,385 | A |  | 12/1994 | Hayashi et al. |  |
| 5,627,720 | A | * | 5/1997 | Lewis | 361/118 |
| 6,380,862 | B1 | * | 4/2002 | Karim et al. | 340/635 |
| 2002/0054465 | A1 | * | 5/2002 | Gerlach | 361/111 |

* cited by examiner

Primary Examiner—Phuong T. Vu
Assistant Examiner—Dharti H. Patel
(74) Attorney, Agent, or Firm—Donald R. Schoonover

(57) ABSTRACT

A device is easily connected to a utility panel of a building and includes signals to indicate improper operation in the electrical system of the building. The device further includes a system for dispersing an extinguishing agent into the utility panel box in the event a power surge is of sufficient magnitude.

1 Claim, 1 Drawing Sheet

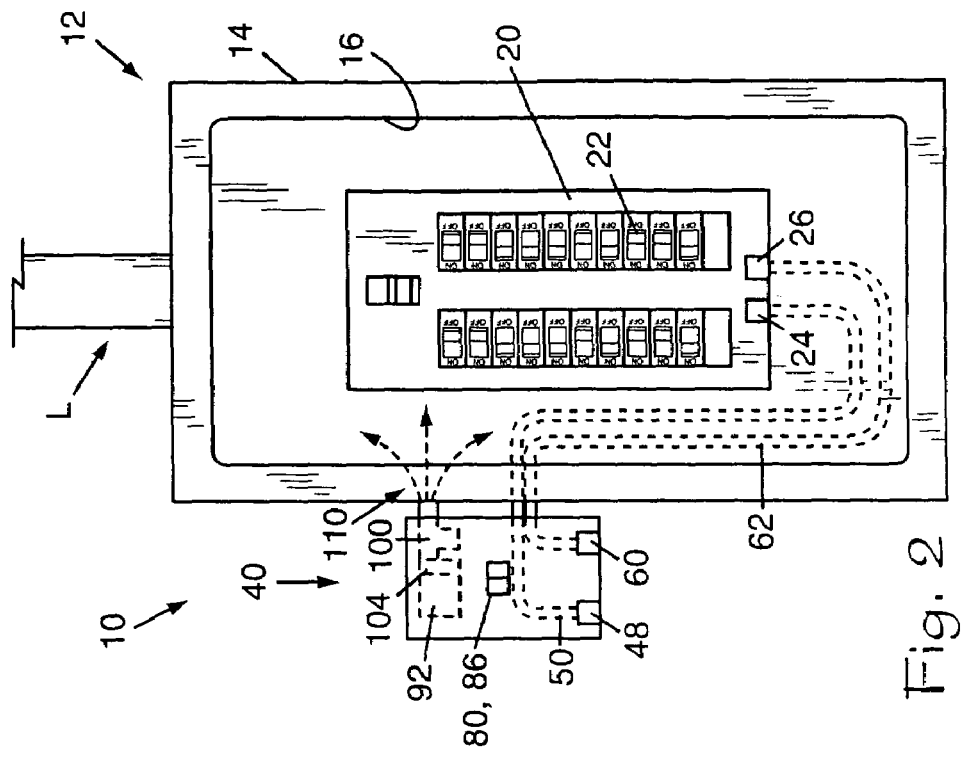
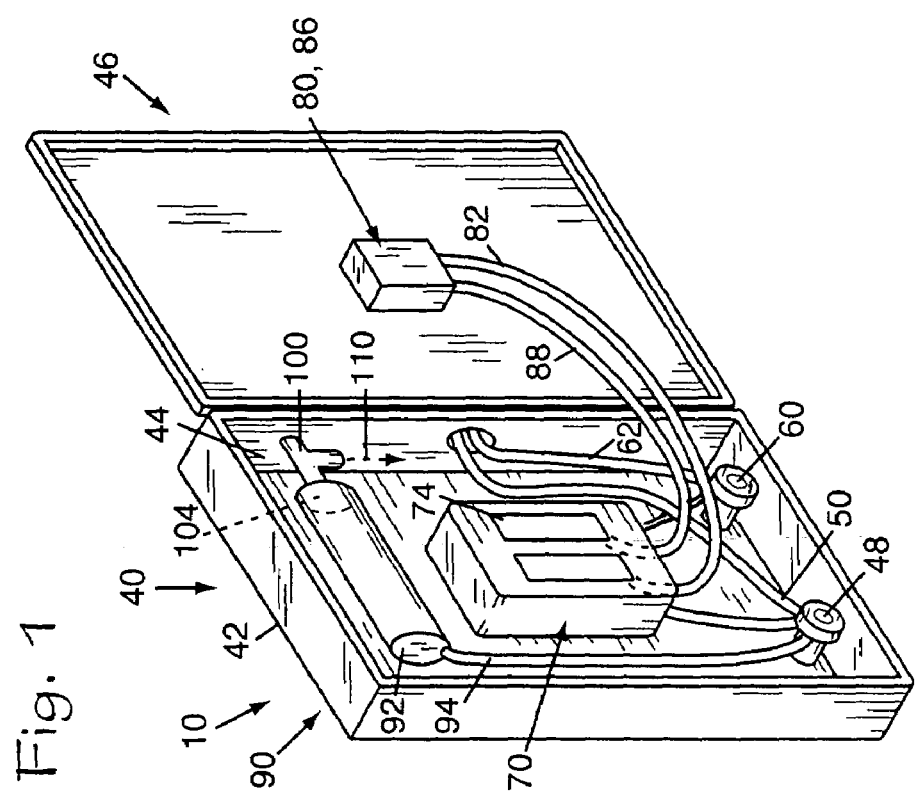

POWER SURGE PROTECTION DEVICE

BACKGROUND OF THE INVENTION

1. Field of the Invention

The present invention relates to the general art of electrical accessories, and to the particular field of surge protection equipment.

2. Discussion of the Related Art

Building safety is a major concern to any property owner or renter. One concern of anyone who owns or occupies a building is associated with a power surge in the electrical system. The power surge can result from lightning, fires, failures in the electrical system servicing the property, or the like.

A power surge can damage or destroy electrical equipment in the building, and can even start a fire in some cases. Furthermore, a power surge that is of sufficient magnitude may damage other equipment in the building.

Therefore, there is a need for a means for protecting a building against a power surge in the electrical system.

The art contains several examples of UPS equipment, power surge protection equipment, and the like. However, there does not appear to be any easily installed equipment that can protect an entire building.

Therefore, there is a need for an easily installed means for protecting a building against a power surge in the electrical system.

Still further, if the power surge is significant enough, there may be a fire in the utility connection box at which the building wiring is connected to the wiring associated with a utility. This could be a catastrophic event.

Therefore, there is a need for a means for protecting a building against a power surge in the electrical system as well as protecting against any fire that might be associated with the power surge.

PRINCIPAL OBJECTS OF THE INVENTION

It is a main object of the present invention to provide a means for protecting a building against a power surge in the electrical system.

It is another object of the present invention to provide an easily installed means for protecting a building against a power surge in the electrical system.

It is another object of the present invention to provide a means for protecting a building against a power surge in the electrical system as well as protecting against any fire that might be associated with the power surge.

SUMMARY OF THE INVENTION

These, and other, objects are achieved by a power surge protection unit that is installed in a building utility connection panel. The unit embodying the present invention includes elements that will alert someone if a breaker has been tripped. The unit further includes a system for dispersing a extinguishing agent in the utility box if a power surge is of sufficient magnitude.

Using the power surge protection unit embodying the present invention is easily installed and will generate an alert if a breaker is tripped and can protect the utility panel against fire.

BRIEF DESCRIPTION OF THE DRAWING FIGURES

FIG. 1 is a perspective view of a power surge protection device embodying the present invention.

FIG. 2 is a front elevational view of a utility panel to which the power surge protection device of the present invention is connected.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a power surge protection unit 10. Unit 10 comprises a utility connection panel unit 12, which connects a utility to a building via feed lines L. Utility connection panel unit 12 includes a housing 14 having an interior volume 16. A panel 20 contains a plurality of circuit breaker elements, such as element 22, which are located inside housing 14 and serve the functions usual to such elements. Utility connection panel unit 12 further includes a neutral connection element 24 and a ground connection element 26.

Unit 10 further includes a power surge protection and indicating unit 40. Unit 40 is mounted adjacent to utility connection panel unit 12 and includes a housing 42, which has an interior volume 44 and a door 46 which covers and uncovers the interior volume 44.

A neutral connection element 48 is located in the housing 42 of the power surge protection and indicating unit 40 and an electrical connection 50 electrically connects the neutral connection element 48 of the power surge protection and indicating unit 40 to the neutral connection element 24 of the utility connection panel unit 12.

A ground connection element 60 is located in the housing 42 of the power surge protection and indicating unit 40 and an electrical connection 62 electrically connects the ground connection element 60 of the power surge protection and indicating unit 40 to the ground connection element 26 of the utility connection panel unit 12.

A neutral circuit fuse element 70 is also located in the housing 42 of the power surge protection and indicating unit 40. The neutral circuit fuse element 70 is connected to the neutral connection element 48. A ground circuit fuse element 74 is located in the housing 42 of the power surge protection and indicating unit 40. The ground circuit fuse element 74 is connected to the ground connection element 60.

A neutral fault indicator element 80 is located on the housing 42 of the power surge protection and indicating unit 40, and an electrical connection 82 is located between the neutral fault indicator element 80 and the neutral connection element 48 in the housing 42 of the power surge protection and indicating unit 40. A ground fault indicator element 86 is located on the housing 42 of the power surge protection and indicating unit 40, and an electrical connection 88 is located between the ground fault indicator element 86 and the ground connection element 60 in the housing 42 of the power surge protection and indicating unit 40.

An extinguishing agent dispensing system 90 is located in housing 42 and includes a container 92 of extinguishing agent located in the housing 42 of the power surge protection and indicating unit 40. Container 92 is electrically uncharged in a normal state. The extinguishing agent is similar to the extinguishing agents used in ABC fire extinguishers, compressed dry air or SF6 gas, which extinguishes arcs in high-voltage circuit breakers.

An electrical connection 94 is located in housing 42 and electrically connects the container 92 of the extinguishing agent to the neutral connection element 48 of the power surge protection and indicating unit 40. The container 92 of extinguishing agent becomes negatively charged during a power surge.

A fluid connection conduit 100 is located between the container 92 of extinguishing agent and the interior of the housing 14 of the utility connection panel unit 12 and the interior of the housing 42 of the power surge protection and indicating unit 40. The container 92 includes a valve 104 which permits extinguishing agent to flow out of the container 92 when the container 92 becomes negatively charged. Valve 104 is fluidically connected to fluid connection conduit 100 between the container 92 of extinguishing agent and the interior of the housing 14 of the utility connection panel unit and the interior of the housing of the power surge protection and indicating unit 40.

During a power surge, extinguishing agent 110 is dispensed into housing 14 of utility connection panel unit 12 and the indicators 80 and/or 86 are activated.

It is understood that while certain forms of the present invention have been illustrated and described herein, it is not to be limited to the specific forms or arrangements of parts described and shown.

What is claimed is:

1. A power surge protection unit comprising:
    a) a utility connection panel unit which connects a utility to a building, said utility connection panel unit including
        (1) a housing having an interior volume,
        (2) a plurality of circuit breaker elements,
        (3) a neutral connection element, and
        (4) a ground connection element; and
    b) a power surge protection and indicating unit which includes
        (1) a housing,
        (2) a neutral connection element in the housing of said power surge protection and indicating unit,
        (3) an electrical connection electrically connecting the neutral connection element of said power surge protection and indicating unit to the neutral connection element of said utility connection panel unit,
        (4) a ground connection element in the housing of said power surge protection and indicating unit,
        (5) an electrical connection electrically connecting the ground connection element of said power surge protection and indicating unit to the ground connection element of said utility connection panel unit,
        (6) a neutral circuit fuse element in the housing of said power surge protection and indicating unit, the neutral circuit fuse element being connected to the neutral connection element,
        (7) a ground circuit fuse element in the housing of said power surge protection and indicating unit, the ground circuit fuse element being connected to the ground connection element,
        (8) a neutral fault indicator element on the housing of said power surge protection and indicating unit,
        (9) an electrical connection between the neutral fault indicator element and the neutral connection in the housing of said power surge protection and indicating unit,
        (10) a ground fault indicator element on the housing of said power surge protection and indicating unit,
        (11) an electrical connection between the ground fault indicator element and the ground connection in the housing of said power surge protection and indicating unit,
        (12) a distinguishing agent dispensing system which includes
            (A) a container of distinguishing agent located in the housing of said power surge protection and indicating unit, the container being electrically uncharged,
            (B) an electrical connection electrically connecting the container of the distinguishing agent to the neutral connection element of said power surge protection and indicating unit, the container of distinguishing agent becoming negatively charged during a power surge,
            (C) a fluid connection between the container of distinguishing agent and the interior of the housing of said utility connection panel unit and the interior of the housing of said power surge protection and indicating unit, and
            (D) the container including a valve which permits distinguishing agent to flow out of the container when the container becomes negatively charged, the valve being fluidically connected to the fluid connection between the container of distinguishing agent and the interior of the housing of said utility connection panel unit and the interior of the housing of said power surge protection and indicating unit.

\* \* \* \* \*

UNITED STATES PATENT AND TRADEMARK OFFICE
CERTIFICATE OF CORRECTION

PATENT NO. : 7,064,947 B1
APPLICATION NO. : 10/853650
DATED : June 20, 2006
INVENTOR(S) : Darren Chisolm It is certified that error appears in the above-identified patent and that said Letters Patent is hereby corrected as shown below:

Col. 3 Line 25-48
Amend claim 1 as follows:

1. A power surge protection unit comprising:
   a) a utility connection panel unit which connects a utility to a building, said utility connection panel unit including
      (1) a housing having an interior volume,
      (2) a plurality of circuit breaker elements,
      (3) a neutral connection element, and
      (4) a ground connection element; and
   b) a power surge protection and indicating unit which includes
      (1) a housing,
      (2) a neutral connection element in the housing of said power surge protection and indicating unit,
      (3) an electrical connection electrically connecting the neutral connection element of said power surge protection and indicating unit to the neutral connection element of said utility connection panel unit,
      (4) a ground connection element in the housing of said power surge protection and indicating unit,
      (5) an electrical connection electrically connecting the ground connection element of said power surge protection and indicating unit to the ground connection element of said utility connection panel unit,
      (6) a neutral circuit fuse element in the housing of said power surge protection and indicating unit, the neutral circuit fuse element being connected to the neutral connection element,
      (7) a ground circuit fuse element in the housing of said power surge protection and indicating unit, the ground circuit fuse element being connected to the ground connection element,
      (8) a neutral fault indicator element on the housing of said power surge protection and indicating unit,
      (9) an electrical connection between the neutral fault indicator element and the neutral connection in the housing of said power surge protection and indicating unit,
      (10) a ground fault indicator element on the housing of said power surge protection and indicating unit,
      (11) an electrical connection between the ground fault indicator element and the ground connection in the housing of said power surge protection and indicating unit,

UNITED STATES PATENT AND TRADEMARK OFFICE
CERTIFICATE OF CORRECTION

PATENT NO. : 7,064,947 B1  
APPLICATION NO. : 10/853650  
DATED : June 20, 2006  
INVENTOR(S) : Darren Chisolm Page 2 of 2

It is certified that error appears in the above-identified patent and that said Letters Patent is hereby corrected as shown below:

(12) ~~a distinguishing~~ an extinguishing agent dispensing system which includes
    (A) a container of ~~distinguishing~~ extinguishing agent located in the housing of said power surge protection and indicating unit, the container being electrically uncharged,
    (B) an electrical connection electrically connecting the container of the ~~distinguishing~~ extinguishing agent to the neutral connection element of said power surge protection and indicating unit, the container of ~~distinguishing~~ extinguishing agent becoming negatively charged during a power surge,
    (C) a fluid connection between the container of ~~distinguishing~~ extinguishing agent and the interior of the housing of said utility connection panel unit and the interior of the housing of said power surge protection and indicating unit, and
    (D) the container including a valve which permits ~~distinguishing~~ extinguishing agent to flow out of the container when the container becomes negatively charged, the valve being fluidically connected to the fluid connection between the container of ~~distinguishing~~ extinguishing agent and the interior of the housing of said utility connection panel unit and the interior of the housing of said power surge protection and indicating unit.

Signed and Sealed this

Nineteenth Day of December, 2006

JON W. DUDAS  
*Director of the United States Patent and Trademark Office*